G. A. CRITCHERSON.
DENTAL PLATE WITH RUGÆ ON THE LINGUAL SIDE.
APPLICATION FILED NOV. 22, 1913.
1,129,335.
Patented Feb. 23, 1915.
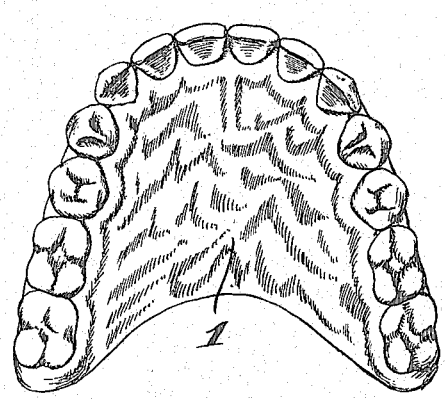
WITNESSES
J. T. Stanley
D. H. Thornett
INVENTOR
G. A. Critcherson.
BY
Elwin S. Clarkson
ATTORNEY

UNITED STATES PATENT OFFICE.

GEORGE A. CRITCHERSON, OF LOS ANGELES, CALIFORNIA, ASSIGNOR TO THE COLUMBUS DENTAL MANUFACTURING CO., OF COLUMBUS, OHIO, A CORPORATION OF OHIO.

DENTAL PLATE WITH RUGÆ ON THE LINGUAL SIDE.

1,129,335.      Specification of Letters Patent.     Patented Feb. 23, 1915.

Application filed November 22, 1913. Serial No. 802,452.

*To all whom it may concern:*

Be it known that I, GEORGE A. CRITCHERSON, a citizen of the United States, residing at Los Angeles, in the county of Los Angeles and State of California, have invented certain new and useful Improvements in Dental Plates with Rugæ on the Lingual Side, of which the following is a specification.

The figure in the drawing is a bottom plan view of a dental plate embodying my invention.

In the manufacture in dental plates they have been molded with a smooth lingual side which results in imperfect articulation of speech and in imperfect management of food in mastication, because when the lingual side of the plate is smooth the tongue has but little power to hold a morsel of food upon it.

The object of my invention is to produce a duplication of the natural rugæ of a human mouth in the lingual side of denture plates by means of a suitable mold held in the plaster when the plate is flasked.

A suitable rugæ mold, such for instance as that shown in my divisional application filed May 1st, 1914, Serial No. 835,669, is placed on the denture plate before the plate is flasked, such mold being formed with a series of undulations, in imitation of a natural rugæ, which will produce, in the lingual side of the plate a rugæ without discoloration or injury to the material of which the plate is composed, and when the mold is removed the surface of the vulcanite will be left clean and smooth and will require but little polishing.

The purpose of my invention is to form a rugæ 1 on the lingual side of the plate so as to enable persons using dental plates to pronounce all words with freedom and distinctness, especially those words requiring the tongue to be placed against the roof of the mouth, and which can only be pronounced clearly through the coöperation of the rugæ and the tongue, besides which the rugæ is of material assistance to the tongue in the management of food in mastication, which, of course, is of material importance in maintaining one's health.

I claim:

A dental plate with rugæ molded on the lingual side thereof.

In testimony whereof I affix my signature in presence of two witnesses.

GEORGE A. CRITCHERSON.

Witnesses:
    C. W. ROHRER,
    FLORENCE E. LEA.

Copies of this patent may be obtained for five cents each, by addressing the "Commissioner of Patents, Washington, D. C."